United States Patent
Gandhi et al.

(10) Patent No.: US 7,489,901 B2
(45) Date of Patent: Feb. 10, 2009

(54) METHOD FOR DYNAMICALLY ESTIMATING NOISE FLOOR AND RISE OVER THERMAL (ROT)

(75) Inventors: Asif D. Gandhi, Iselin, NJ (US); Matthijs A. Visser, Hoboken, NJ (US); Lily H. Zhu, Parsippany, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 630 days.

(21) Appl. No.: 10/953,552

(22) Filed: Sep. 30, 2004

(65) Prior Publication Data

US 2006/0068717 A1    Mar. 30, 2006

(51) Int. Cl.
*H04B 15/00* (2006.01)
(52) U.S. Cl. ............... 455/63.1; 455/67.13; 455/226.2
(58) Field of Classification Search ........ 455/450, 455/453, 63.1, 65, 67.11, 67.13, 226.1, 226.2, 455/226.3
See application file for complete search history.

(56) References Cited

U.S. PATENT DOCUMENTS

| | | | |
|---|---|---|---|
| 6,374,096 B1 * | 4/2002 | Parr | 455/226.1 |
| 7,079,494 B2 * | 7/2006 | Marinier et al. | 370/252 |
| 2004/0172242 A1 * | 9/2004 | Seligman et al. | 704/225 |
| 2005/0026624 A1 * | 2/2005 | Gandhi et al. | 455/453 |
| 2005/0043034 A1 * | 2/2005 | Abdel-Ghaffar et al. | 455/453 |
| 2005/0054383 A1 * | 3/2005 | Webster et al. | 455/562.1 |
| 2006/0063545 A1 * | 3/2006 | Yang et al. | 455/513 |

FOREIGN PATENT DOCUMENTS

EP    WO 200209326 A  *  1/2002

* cited by examiner

*Primary Examiner*—Nguyen Vo

(57) ABSTRACT

The present invention provides a method for dynamically estimating noise floor by continuously updating a noise floor value based on the noise floor value and sampled receive strength indications. In an alternative, the noise floor may be updated based on sampled receive strength indications and the reverse link loading value. In yet another alternative, the noise floor may be updated based on sampled receive strength indications and a range relative to a reference noise floor value.

15 Claims, 3 Drawing Sheets

METHOD FOR DYNAMICALLY ESTIMATING NOISE FLOOR AND RISE OVER THERMAL (ROT)

FIELD OF THE INVENTION

Exemplary embodiments of the present invention relate to a method for dynamically estimating a noise floor value and a receive strength indication rise.

BACKGROUND OF THE INVENTION

The performance and coverage of a wireless communication system (e.g., a code division multiple access system (CDMA)) may be dependent upon the amount of interference in a relevant frequency band. Sources of interference may include the wireless communication system itself, external sources of electromagnetic energy, geological formations such as mountains, and/or man made objects such as buildings.

For example, transmission of information (e.g. voice and/or data) from mobile stations, on a reverse link, or from a base station, on a forward link may generate undesirable interference. Interference at a base station of a wireless system may reduce reverse link coverage and/or reliability. Accordingly, a base station may improperly drop a call of a subscriber station, a subscriber station may experience low voice quality or a high frame error rate, or a subscriber station may have an increased access failure rate.

As is well-known in the art, accurate and updated estimations of noise floor values are important in the accurate and updated estimations of the rise in receive strength indications (e.g. RSSI rise or rise over thermal (ROT)), for a given link (e.g. a reverse link). Further, the accurate estimation of a receive strength indication rise (e.g., RSSI rise or rise over thermal (ROT)) may be important in understanding system loading and, further, in controlling a wireless communications system.

Current empirical noise floor values may differ, or substantially differ, within a wireless communication system (e.g., within cells of a wireless communication system) as a result of, for example, hardware variations, differences in surroundings, the presence of an interferer or jammer, etc. Further, current empirical noise floor values may also differ, or substantially differ, in a plurality of diversity receive paths of an individual cell due to different received path gains. Further still, current empirical noise floor values may vary with current system loading, which may vary with time.

As is well known in the art, conventional wireless communication systems, an example of which is illustrated in FIG. 1, utilizes a hard-coded noise floor value as an initial value. This initial noise floor value is used by the wireless communications system for twenty-four hours and is updated to a new value in any well-known manner, only at the end of a twenty-four hour period.

This presents a problem in the control of a wireless communications systems in that the noise floor for the first twenty four hours, i.e., the hard coded noise floor, may be different, or substantially different, than the actual current noise floor value for a given time and/or location within a wireless communication system. Accordingly, a need exists for a faster more accurate estimation of the noise floor and rise over thermal (ROT).

SUMMARY OF THE INVENTION

Exemplary embodiments of the present invention provide a method for dynamically estimating a noise floor value and rise over thermal (ROT) in a wireless communication system.

An exemplary embodiment of the present invention provides a method for dynamically estimating noise floor based on a noise floor value and sampled receive strength indications. An exemplary embodiment of the method may include continuously updating the noise floor value, within the wireless system, if a minimum one of sampled receive strength indications is less than the current noise floor value NFL. If the minimum one of the sampled receive strength indications is less than the current noise floor value NFL, the current noise floor value NFL may be set equal, or substantially equal, to a minimum one of the sample receive strength indications.

In exemplary embodiments of the present invention, the noise floor may be continuously updated for a first time period, which may be, for example, 24 hours.

Another exemplary embodiment of the present invention provides another method for updating a noise floor value based on sampled receive strength indications and at least one reverse link loading value. Exemplary embodiments of the method may include measuring a reverse link loading value and determining a minimum one of the sampled receive strength indications. A counter value may be incremented if the current reverse link loading value is above a reverse link loading threshold value. The counter value may be compared to a counter threshold value and the noise floor value may be changed if the counter value exceeds the counter threshold value. This exemplary embodiment of the present invention may occur before, after, and/or concurrently therewith the continuously updating of a noise floor value as described above.

Another exemplary embodiment of the present invention may provide method for updating a noise floor value based on sampled receive strength indications and a range relative to a reference noise floor value. Exemplary embodiments of the method may include changing the noise floor if a minimum one of the sampled receive strength indications is within a range relative to a reference noise floor value. This exemplary embodiment of the present invention may occur before, after, and/or concurrently therewith the continuously updating of a noise floor value as described above.

In exemplary embodiments of the present invention, an updated noise floor value may be established as a reference noise floor value continuously or at the end of the first time period. At least one of the noise floor value and the reference noise floor value may be reset periodically after the first time period. The periodically resetting of at least one of the noise floor value and the reference noise floor value may occur daily, i.e., every twenty-four hours.

In exemplary embodiments of the present invention, a current receive strength indication may be measured and a receive strength indication rise value (e.g., rise over thermal (ROT)) may be determined based on the current receive strength indication and the continuously updated noise floor value.

In exemplary embodiments of the present invention, noise floor values may be estimated for a plurality of diversity paths.

BRIEF DESCRIPTION OF THE DRAWINGS

Exemplary embodiments of the present invention will become more fully understood from the detailed description given herein below and the accompanying drawings, wherein like elements are represented by like reference numerals, which are given by way of illustration only and thus are not limiting of the present invention and wherein.

DETAILED DESCRIPTION OF EXEMPLARY EMBODIMENTS OF THE PRESENT INVENTION

Figure 1:
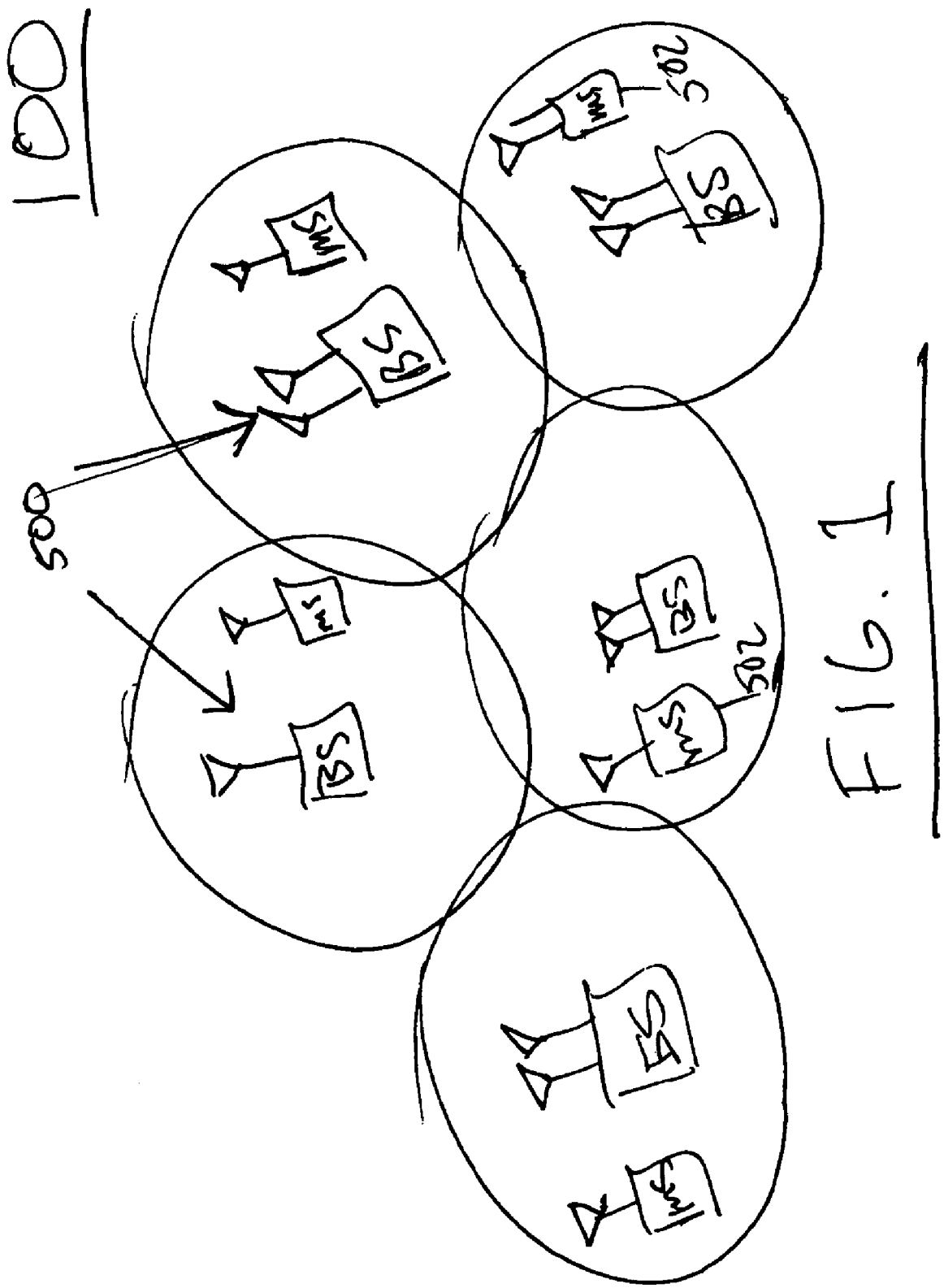
FIG. 1 illustrates a conventional wireless communication system including a plurality of cells and/or sectors.

FIG. 1 illustrates a conventional wireless communication system 100, including base stations 500, in which exemplary embodiments of the present invention may be implemented. As shown, the base stations 500 may communicate with mobile stations 502 falling within their coverage area. Communication occurs over a forward link (base station-to-mobile station) and a reverse link (mobile station-to-base station). As discussed in the background of the invention section, with respect to the reverse link, the base stations 500 estimate a noise floor and use this estimated noise floor to determine other parameters such as the rise over thermal.

Figure 2:
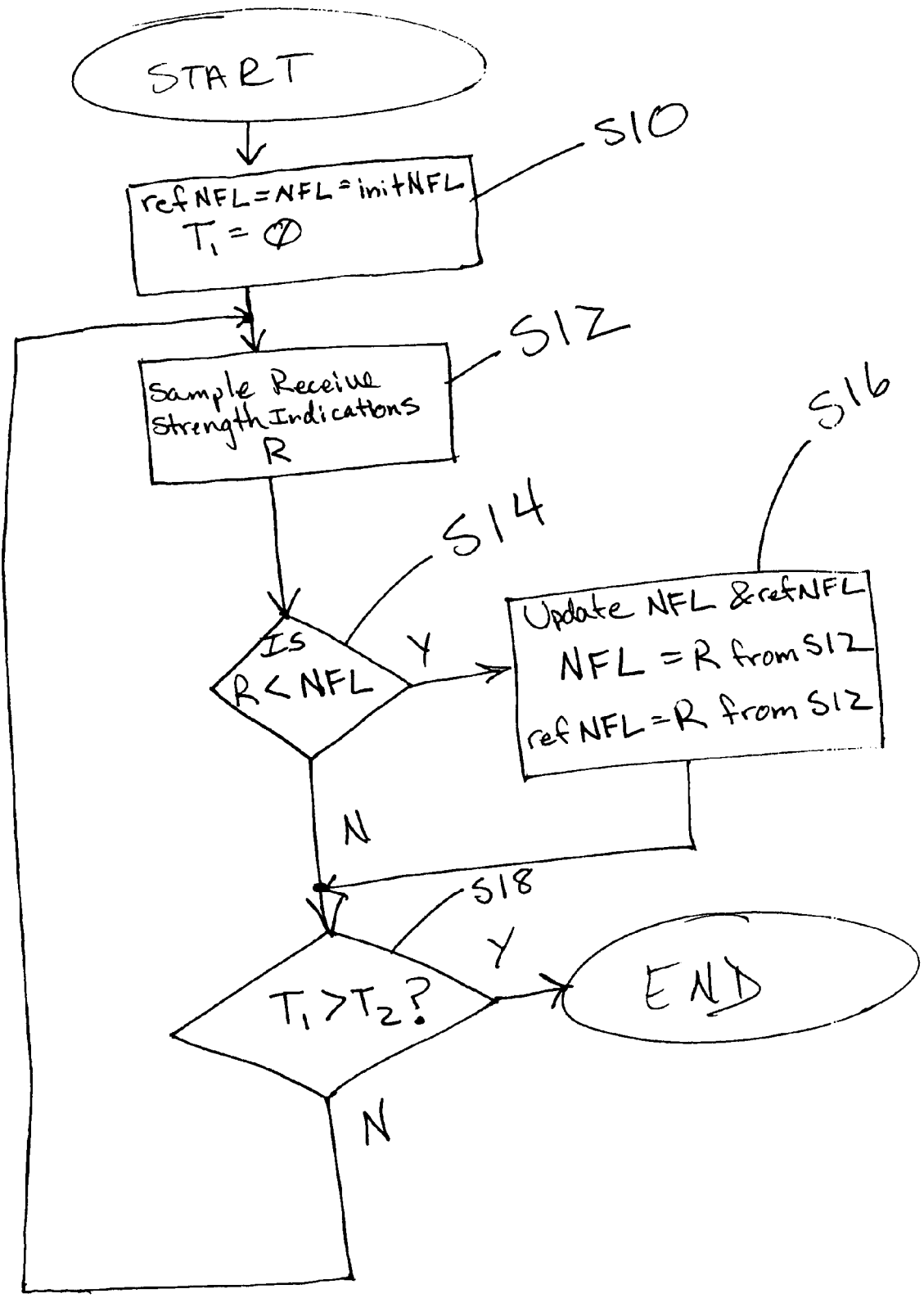
FIG. 2 illustrates an exemplary embodiment of the present invention.

FIG. 2 illustrates an exemplary embodiment of a method for dynamic estimation of a noise floor value. FIG. 2 and other methods of the present invention will be described as implemented at a base station 500 shown in FIG. 1, but the methods of the present invention are not limited to this implementation. With regard to FIG. 2, at step START a cell is booted or rebooted, in any manner as is well-known in the art. At step S10, the noise floor value NFL and/or a reference noise floor value refNFL, which may be for an individual cell, a plurality of cells, or the entire wireless communications system, may be set equal to an initial noise floor value initNFL, and a timer $T_1$, may be initialized to zero. The initial noise floor value initNFL may be a hard coded value.

In step S12, after stabilization of the wireless communications system, (e.g., five minutes after the cell is booted), receive strength indications (e.g., receive signal strength indicators (RSSI)) may be sampled using sampling intervals of, for example, 10 ms or 100 ms. The sampling intervals may be based on and/or proportional to the length of time that method is performed. That is, sampling intervals may increase as the run time of the method increases, and the sampling intervals may decrease as the run time decreases. As shown in step S14, a sampled receive strength indication R may be compared with the noise floor value NFL to determine whether the sampled receive strength indication R is less than the noise floor value NFL.

As shown in Step S18, if the sampled receive strength indication R is greater than or equal to the noise floor value NFL, the base station 500 determines if the time $T_1$ exceeds a threshold $T_2$. The threshold $T_2$ sets the length (or run time) that the method is performed. For example, in one embodiment the method may be twenty-four hours. If the timer $T_1$ does not exceed the threshold $T_2$, the procedure returns to step S12.

Returning to step S14, if the sampled receive strength indication R is less than the noise floor value NFL and/or the reference noise floor value refNFL, the noise floor value NFL and/or the reference noise floor value refNFL may be set equal to the sampled receive strength indication R in step S16. Processing then proceeds to step S18.

If in step S18, the timer $T_1$ exceeds the threshold $T_2$, the runtime for the method may be complete, and the method may return to START.

Figure 3:
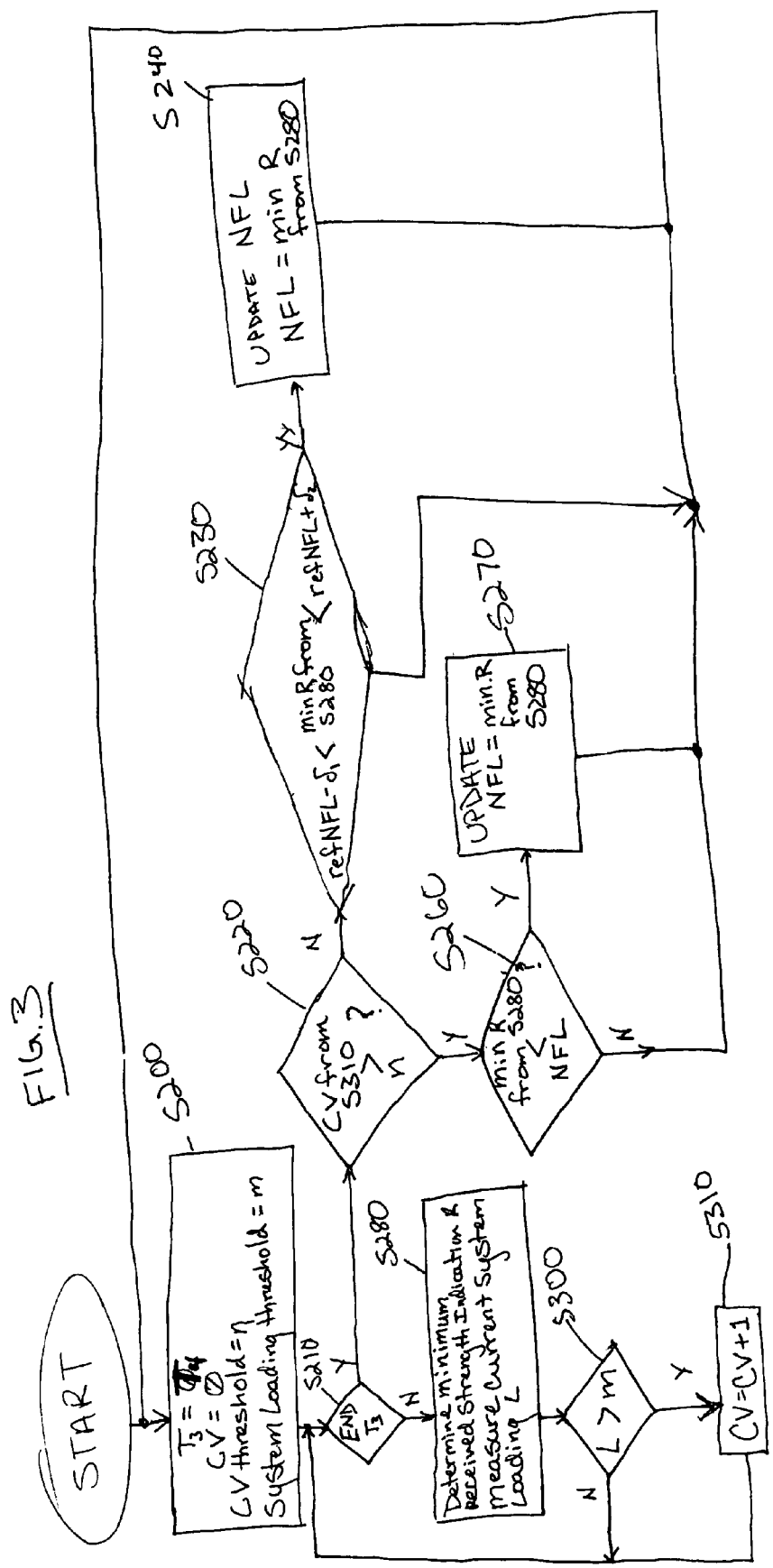
FIG. 3 illustrates another exemplary embodiment of the present invention.

FIG. 3 illustrates another exemplary embodiment of the present invention for dynamically estimating a noise floor value. With regard to FIG. 3, at step S200, a timer $T_3$ is set to a desired time period $T_4$ for performing a measurement cycle (e.g., one hour) and begins counting down. Also, a counter value CV is initialized to zero, a counter threshold is initialized to n, and a system loading threshold is initialized to a variable m. The counter threshold value n and the system loading threshold values m may be numbers greater than or equal to zero. Any or all of these values may be initialized to their respective values by a system operator as a matter of design choice.

At step S210, timer $T_3$ may be checked for completion. If the timer $T_3$ has not completed counting down to zero, processing proceeds to step S280. As with the embodiment of FIG. 2, receive strength indications (e.g., receive signal strength indicators (RSSI)) may be sampled using sampling intervals of, for example, 10 ms or 100 ms. The sampling intervals may be chosen in a similar manner as described above with respect to FIG. 2. The receive strength indications may be sampled multiple times and may be sampled for a period of time, which is less than the time for the timer $T_3$ to count down to zero. In step S280, the sampled receive strength indications sampled during the time period measured by the timer $T_3$ may be compared to one another in order to determined a minimum one of the sampled receive strength indications. In step S280 a current system loading L (e.g., a current reverse link loading) may also be measured. The minimum receive strength indication R (e.g., RSSI) and the current system loading L may also be determined in any manner as is well-known in the art.

As shown in step S300, a current system loading L may be compared to the system loading threshold m. As shown in step S310, if the current system loading L is greater than the loading system threshold m, the counter value CV may be incremented such that the counter value may be CV+1. Processing then returns to step S210.

Returning to step S300, if the current system loading L is less than or equal to the system loading threshold m, the procedure returns to step S210.

Returning to step S210, if timer $T_3$ has completed counting down to zero, the counter value CV may be compared with the counter threshold value n in step S220. If the counter value CV is less than or equal to the counter value threshold n, the minimum one of the sampled receive strength indications R, from step S280, may be compared to a range relative to the reference noise floor value refNFL. The reference noise floor value refNFL may be determined by the steps as illustrated in FIG. 2 or any other manner as is well-known in the art (e.g., may be the hard coded value of the conventional art). The range relative to the reference noise floor value refNFL may be $+\delta_1$ and $-\delta_2$ of the reference noise floor value refNFL, wherein $\delta_1$ and $\delta_2$ may be, for example, ±0.5 dB. However, $\delta_1$ and $\delta_2$ may be different values. Accordingly, the base station 500 determines in step S220 if the noise floor value NFL meets the following expression: (refNFL−$\delta_1$)<NFL< (refNFL+$\delta_2$).

If the minimum one of the sampled receive strength indications R, as determined step S280, is within the range as discussed above, the current noise floor value NFL may be set equal to the minimum one of the sampled receive strength indications R in step S240.

Returning to step S230, if the minimum one of the sampled receive strength indications, as determined in step S280, is not in the range relative to the reference noise floor value refNFL, as discussed above, the procedure returns to step S200.

Returning to step S220, if the counter value CV is greater than the counter value threshold n, the minimum one of the sampled receive strength indications R, as determined in step S280, may be compared with the noise floor value NFL in step S260. If the minimum one of the sampled receive strength indications R, as determined in step S280, is greater than or equal to the noise floor value NFL, the procedure may return to step S200. However, if the minimum one of the sampled receive strength indications R, as determined in step S280, is less than the noise floor value NFL, the noise floor value NFL may be set equal to the minimum one of the sampled receive strength indications R, from step S280.

In exemplary embodiments of the methods as described herein, the time period over which an updated noise floor value NFL may be determined may be one hour (e.g., $T_4$=one hour). Further, the method, as described in FIG. 3, may be performed repetitively every hour. However, with regard to FIG. 3, it will be understood that $T_4$ may be any length of time, and the method as described in FIG. 3 may be performed repetitively every $T_4$ period of time.

In exemplary embodiments of the present invention, when the time $T_1$ is greater than $T_2$, and/or the timer $T_3$ expires, the noise floor value NFL may be reset to a reference noise floor value refNFL or an initial noise floor value initNFL and the method repeated. The time $T_2$ and the time at which the time $T_3$ expires may be, for example, one hour or twenty-four hours.

The exemplary embodiments of the present invention as illustrated in FIGS. 2 and 3 have been described herein as operating separately from one another. However, it will be understood that the methods as described herein may be performed serially, (i.e., one after another). For example, the method as described in FIG. 2, may be performed for a first time period and, subsequently, the method as described with respect to FIG. 3 may be performed. Exemplary embodiments of the methods as illustrated in FIGS. 2 and 3 may also be performed concurrently at least for a period of time. For example, the methods of FIGS. 2 and 3 may be performed concurrently for a first time period at the end of which the method of FIG. 2 is terminated.

Exemplary embodiments of the present invention as described herein provide a faster and/or dynamic estimation of a noise floor value or values within a wireless communication system. Further, exemplary embodiments of the present invention may be implemented within conventional base stations, base station controllers, and/or any other suitable portion of the wireless communication system, as desired by one of ordinary skill in the art.

Although exemplary embodiments of the present invention have been described with respect to a sampling interval of 10 ms or 100 ms, it will be understood that receive strength indications may be sampled in any suitable manner using any suitable sampling interval as desired by one of ordinary skill in the art.

Although exemplary embodiments of the present invention have been described as being performed iteratively, it will be understood that exemplary embodiments of the present invention may be performed continuously or any other suitable manner, as desired by one of ordinary skill in the art.

Although exemplary embodiments of the present invention have been described with respect to a period of time equal to one hour or twenty-four hours, it will be understood that any suitable time period may be used as desired by one of ordinary skill in the art.

Exemplary embodiments of the present invention being thus described, it will be obvious to one of ordinary skill in the art that the same may be varied in many ways. Such variations are not to be regarded as a departure from the invention, and all such modifications are intended to be included within the scope of the invention.

We claim:

1. A method for dynamically estimating noise floor comprising:
   continuously updating a noise floor value based on the noise floor value and sampled receive strength indications, the continuously updating step being performed for a first time period;
   establishing a reference noise floor value as the updated noise floor value continuously or at the end of the first time period; and
   continuously or periodically resetting the noise floor value and the reference noise floor value after the first time period.

2. The method of claim 1, wherein the continuously updating step updates the noise floor value based on a comparison of the sampled receive strength indications and the noise floor.

3. The method of claim 1, wherein the continuously updating step updates the noise floor value if a sampled receive strength indication is less than the noise floor value.

4. The method of claim 3, wherein the continuously updating step sets the noise floor value equal to the sampled receive strength indication if the sampled receive strength indication is less than the noise floor value.

5. The method of claim 1, wherein the first time period is twenty-four hours.

6. The method of claim 1, further comprising,
   measuring a current receive strength indication, and
   determining a receive strength indication rise value based on the current receive strength indication and the continuously updated noise floor value.

7. The method claim 1, wherein the continuously updating step is performed for a plurality of diversity paths.

8. A method for dynamically estimating noise floor comprising:
   continuously updating a noise floor value based on the noise floor value and sampled receive strength indications, the continuously updating step being performed for a first time period;
   establishing a reference noise floor value as the updated noise floor value continuously or at the end of the first time period; and
   selectively resetting the noise floor value and the reference noise floor value periodically after the first time period.

9. The method of claim 8, wherein the resetting step resets at least one of the noise floor value and the reference noise floor value daily.

10. The method of claim 8, wherein the noise floor value is selectively reset based on a range relative to the reference noise floor value.

11. The method of claim 8, further comprising,
measuring a reverse link loading value,
determining a minimum one of the sampled receive strength indications, and wherein
the selectively resetting step resets the noise floor based on the minimum one of the sampled receive strength indications and the reverse link loading.

12. The method of claim 11, further comprising,
incrementing a counter value if the current reverse link loading value is above a reverse link loading threshold value,
comparing the counter value to a counter threshold value; and wherein
the selectively resetting step resets the noise floor value if the counter value exceeds the counter threshold value.

13. The method of claim 12, wherein the selectively resetting step resets the noise floor value if a minimum one of the sampled receive strength indicators is within a range relative to the reference noise floor value.

14. The method of claim 8, further comprising,
measuring a current receive strength indication; and
determining a receive strength indication rise value based on the current receive strength indication and the selectively reset noise floor value.

15. A method for dynamically estimating the noise floor comprising:
continuously updating a noise floor value based on the noise floor value and sampled receive strength indications, the continuously updating step being performed for a plurality of diversity paths for a first time period;
establishing a reference noise floor value as the updated noise floor value continuously or at the end of the first time period; and
selectively resetting the noise floor value and the reference noise floor value periodically after the first time period.

* * * * *